UNITED STATES PATENT OFFICE.

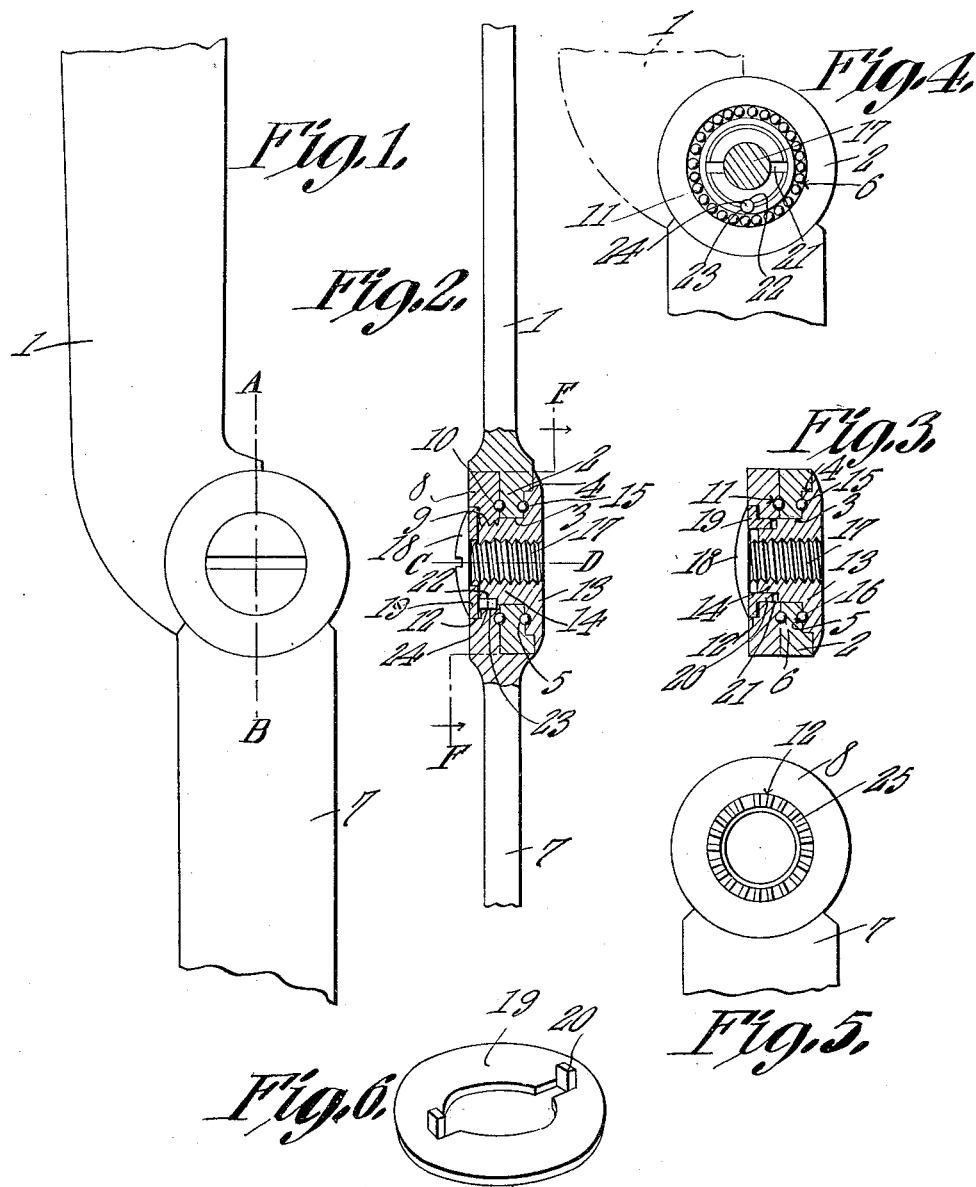
W. F. LANG.
KNEE JOINT.
APPLICATION FILED MAR. 9, 1915.
1,138,298.
Patented May 4, 1915.

WILLIAM F. LANG, OF PITTSBURGH, PENNSYLVANIA.

KNEE-JOINT.

1,138,298.

Specification of Letters Patent.

Patented May 4, 1915.

Application filed March 9, 1915. Serial No. 13,198.

*To all whom it may concern:*

Be it known that I, WILLIAM F. LANG, a citizen of the United States, residing at Pittsburgh, in the county of Allegheny and State of Pennsylvania, have invented a new and useful Knee-Joint, of which the following is a specification.

This invention relates to knee joints especially designed for use in the construction of artificial limbs, one of the objects of the invention being to provide a knee joint which can be adjusted to take up wear and the parts of which are so assembled that they will not accidentally work loose but will remain in the positions to which they are adjusted until a subsequent adjustment is made.

A further object is to provide a knee joint which is comparatively thin and which is provided with bearings whereby the action of the joint is rendered easy.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a knee joint embodying the present improvements. Fig. 2 is a section on line A—B Fig. 1, the central screw being shown in elevation. Fig. 3 is a section on line C—D Fig. 2. Fig. 4 is a section on line E—F Fig. 2. Fig. 5 is a face view of the eye of one of the members of the joint. Fig. 6 is a perspective view of a gasket used in connection with the joint.

Referring to the figures by characters of reference 1 designates a bar provided at one end with a laterally offset eye 2 having a central bore 3, there being a counter bore 4 in the outer face of the said eye concentric with the bore 3.

A ball race 5 is formed in the counter bore, as shown at 5 and another race 6 is formed in the opposite face of the eye 2.

Another bar has been indicated at 7 and is provided at its upper end with an eye 8 offset laterally and designed to fit against the inner face of the eye 2. This eye 8 has a threaded opening 9 in the center thereof and a ball race 10 is formed in the inner face of said eye 8 so as to lie directly opposite the race 6. The two races are adapted to receive a series of anti-friction balls 11. A counterbore 12 is formed in the outer face of the eye 8.

Fitted against the outer side of the eye 2 and within the counterbore 4 is the head 13 of a sleeve 14, this sleeve having a smooth peripheral portion extending through the bore 3 and a threaded peripheral portion engaging the wall of the threaded opening 9. A ball race 15 is formed in the inner face of the head 13 and is disposed directly opposite the ball race 5, the two races being adapted to receive a series of anti-friction balls 16.

The sleeve 14 and its head 13 are interiorly threaded to receive a screw 17 having a head 18 adapted to bear against a washer or gasket 19 which is seated in the counterbore 12. This washer or gasket is preferably formed of soft metal such as lead, and has lugs 20 struck therefrom and adapted to project into grooves 21 extending longitudinally within the exteriorly threaded portion of the sleeve 14. Thus the washer or gasket 19 is held against rotation relative to the sleeve 14. However, when said gasket is removed, a suitable implement can be inserted into the grooves 21 to enable the sleeve 14 to be screwed into or out of the eye 8.

To prevent the sleeve 14 from turning accidentally within the eye 8, registering grooves 22 and 23 are formed in the peripheral portion of the sleve 14 and in the wall of the bore 9, these grooves being adapted to receive a lock pin 24. The inner wall of the counterbore 12 is formed with radial teeth 25 so that when the washer or gasket 19 is pressed into the counter bore by the head 18 of screw 17, the said teeth will bite into the soft metal of which the washer or gasket 19 is made, so as thus to hold the washer or gasket against rotation within the counterbore.

It is to be understood that when the parts are first assembled, it is not necessary to use the washer or gasket 19 as the said parts will be held properly assembled by the locking pin 24. However, when adjustment of the parts becomes necessary as a result of wear, the locking pin 24 can be removed and the washer or gasket 19 inserted in place so that, when the screw 17 is tightened within the sleeve 14, the washer or gasket 18 will engage the teeth 25 and thus hold the parts against relative movement.

It is of course to be understood that the washer or gasket 19 can be used with the pin 24 as a supplemental means for holding the parts against relative movement.

A joint such as herein described is comparatively thin but is durable and efficient. By providing the counterbore 4, the head 13 will project but a slight distance beyond the face of eye 2 and by providing the anti-friction balls 11 and 16, wear between the parts is reduced to the minimum. As the sleeve 14 is locked to the eye 8 in the manner set forth, it will be apparent that the movement of the eye 2 upon sleeve 14 will have no effect on any part of the bearing sleeve 14 and, consequently, said sleeve cannot work loose.

What is claimed is:—

1. A knee joint including a member having an eye, a sleeve screwed into the eye and having a smooth peripheral portion, a second member having an eye journaled on said smooth peripheral portion, there being a head at one end of the sleeve and bearing against the outer face of the last named eye, anti-friction devices interposed between the eyes and between the head and the eye adjacent thereto, a removable key for locking the sleeve to the other eye, a ductile gasket keyed to the sleeve, teeth upon the last named eye for engaging said gasket, and a screw engaging the sleeve and having a head for binding the gasket against the teeth and the sleeve.

2. A knee joint including separate members, eyes thereon arranged side by side, one of said eyes having a threaded bore and the other eye having a smooth bore, there being a counterbore in the outer face of each eye, the inner wall of the counterbore in the threaded eye being toothed, a sleeve having a smooth peripheral portion constituting a bearing for one of the eyes and having a threaded peripheral portion engaging the threaded bore in the other eye, a head upon the sleeve seated in one of the counterbores, a ductile gasket bearing against that end of the sleeve remote from the head and engaged by the teeth in the toothed counterbore, and a screw extending into the sleeve and having a head bearing against the gasket.

3. A knee joint including a member having an eye, a sleeve screwed into the eye and having a smooth peripheral portion, a second member having an eye journaled on said smooth peripheral portion, there being a head at one end of the sleeve and bearing against the outer face of the last named eye, anti-friction devices interposed between the eyes and between the head and the eye adjacent thereto, a removable key for locking the sleeve to the other eye, and a screw engaging the sleeve and having a head adapted to thrust against the sleeve.

In testimony that I claim the foregoing as my own, I have hereto affixed my signature in the presence of two witnesses.

WILLIAM F. LANG.

Witnesses:
H. W. KARN,
JOHN J. GENIS.

Copies of this patent may be obtained for five cents each, by addressing the "Commissioner of Patents, Washington, D. C."